(12) United States Patent
Shepherd et al.

(10) Patent No.: US 12,086,401 B2
(45) Date of Patent: *Sep. 10, 2024

(54) ADAPTIVE PROGRESSIONS THROUGH CONTENT

(71) Applicant: SLING TV, Englewood, CO (US)

(72) Inventors: Dale Lynn Shepherd, Lindon, UT (US); Bryan Douglas DeVries, Bountiful, UT (US); Taylor Albert McGinnis, Saratoga Springs, UT (US); Andrew Dean Lynn, American Fork, UT (US); Jenna Bradford, Draper, UT (US); Mary Stevens, Spanish Fork, UT (US)

(73) Assignee: SLING TV, Englewood, CO (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/643,828

(22) Filed: Dec. 11, 2021

(65) Prior Publication Data

US 2022/0100364 A1 Mar. 31, 2022

Related U.S. Application Data

(63) Continuation of application No. 16/601,237, filed on Oct. 14, 2019, now Pat. No. 11,237,716.

(51) Int. Cl.
*G06F 3/0354* (2013.01)
*G06F 3/04855* (2022.01)
*G06F 3/04883* (2022.01)

(52) U.S. Cl.
CPC ...... *G06F 3/04855* (2013.01); *G06F 3/03547* (2013.01); *G06F 3/04883* (2013.01); *G06F 2203/04808* (2013.01)

(58) Field of Classification Search
CPC ............ G06F 3/04855; G06F 3/03547; G06F 3/04883; G06F 2203/04808; G06F 3/04842

See application file for complete search history.

(56) References Cited

U.S. PATENT DOCUMENTS 6,157,381 A 12/2000 Bates et al.
6,208,343 B1 3/2001 Roth
(Continued)

OTHER PUBLICATIONS

U.S. Appl. No. 17/643,828, filed Dec. 11, 2021, Dale Lynn Shepherd, Entire Document.

*Primary Examiner* — Jennifer N Welch
*Assistant Examiner* — Amy P Hoang
(74) *Attorney, Agent, or Firm* — Wash Park IP Ltd.; John T. Kennedy

(57) ABSTRACT

Devices, systems and processes facilitate adaptive user progressions through content. A process includes receiving a detected first user input motion and determining, based thereon, a first progression type. The process may include executing: a slow scrub progression when input motion occurs within a first area defined by a first velocity threshold VT1 upper limit and a first array sector range AS1; executing a fast scrub progression when input motion occurs within a second area defined by a second velocity threshold VT2 upper limit and a second array sector range AS2; executing a slow swipe scrub progression when input motion occurs within a third area defined by a third velocity threshold VT3 upper limit and a third array sector range AS3; and executing a fast swipe progression when input motion occurs within a fourth area defined by a fourth velocity threshold VT4 upper limit and a fourth array sector range AS4.

19 Claims, 7 Drawing Sheets

(56) References Cited

U.S. PATENT DOCUMENTS

| | | | |
|---|---|---|---|
| 6,337,694 B1 | 1/2002 | Becker et al. | |
| 6,856,326 B1* | 2/2005 | Zhai | G06F 3/0485 |
| | | | 345/685 |
| 7,665,034 B2 | 2/2010 | Montalcini | |
| 8,370,746 B2 | 2/2013 | Gould | |
| 8,687,023 B2 | 4/2014 | Markiewicz et al. | |
| 8,839,155 B2 | 9/2014 | Ording | |
| 10,073,584 B2 | 9/2018 | Miura et al. | |
| 10,387,026 B2 | 8/2019 | Takimoto | |
| 2003/0187744 A1 | 10/2003 | Goodridge | |
| 2006/0001652 A1 | 1/2006 | Chiu et al. | |
| 2010/0162161 A1 | 6/2010 | Lin et al. | |
| 2010/0269038 A1 | 10/2010 | Tsuda | |
| 2014/0215413 A1* | 7/2014 | Calkins | G06F 3/0483 |
| | | | 715/863 |
| 2015/0026575 A1* | 1/2015 | Martin | G06F 3/04842 |
| | | | 715/720 |
| 2015/0253961 A1* | 9/2015 | Sutton | G06F 3/04842 |
| | | | 715/720 |
| 2015/0363906 A1* | 12/2015 | Huang | G06T 7/33 |
| | | | 382/254 |
| 2018/0364878 A1* | 12/2018 | Penha | H04N 21/47205 |
| 2019/0179526 A1* | 6/2019 | Yellen | G11B 27/00 |
| 2020/0371675 A1* | 11/2020 | Sung | G06F 3/04883 |
| 2022/0004311 A1* | 1/2022 | Lemay | G06F 3/0482 |

* cited by examiner

ADAPTIVE PROGRESSIONS THROUGH CONTENT

CROSS-REFERENCE TO RELATED APPLICATIONS

This application is a Continuation application of and claims priority to currently pending U.S. patent application Ser. No. 16/607,237, which was filed on 14 Oct. 2019, in the name of inventors Shepherd et al., and entitled Devices, Systems and Processes for Facilitating User Adaptive Progressions Through Content, the entire content of which are incorporated herein by reference.

TECHNICAL FIELD

The technology described herein generally relates to devices, systems, and processes for facilitating user adaptive progressions through content. The technology is also related to facilitating a smooth progression through multiple segments of content. More specifically, the technology described herein relates to devices, systems and processes for facilitating progressions through content by use of touchpads, touch surfaces, hand gesture recognition and similar user interfaces. Even more specifically, the technology described herein relates to devices, systems and processes for facilitating smooth scrolling of video and audio-video content as represented by two or more thumbnails presented on a progress bar by a use of a touchpad or similar user interface element.

BACKGROUND

Today, users desiring to selectively progress through multiple portions of content, such as two or more frames of a video, are presented with a limited set of user interface options by which such progression in a given direction, such as forward or backwards, may occur.

One set of user interface options may include the use of buttons, or the like, by which a user may specify a forward or reverse direction by which the video is to progress. Such options may include the ability to specify one of many progression speeds, such as 2×, 15×, 30×, and a direction (forward or backwards). Likewise, users may be presented with an option to skip forward or backwards within a video by designated time amounts, such as 30 seconds or otherwise. Such skipping may occur by selection of a button, voice command, or otherwise. Yet, a user interface option is not provided by which a user's physical movements, such as of movement of a finger on a touch surface, or movement of a hand as a hand gesture, correspond to variable progressions through content, such as one or more segments, frames or elements of a video.

Often, a user's current position in a video may be often represented by an indicator super-imposed on a progress bar, which may an overlay of then presented video content on a display. The indicator indicates a current position within the video, such as on a particular frame of the video. The indicator may also identify such location using a time mark, such as an elapsed time within a total time for the video, a frame number, or other indicator. Regardless of how presented, as used herein a graphical or other (e.g., audible) element indicating a span of segments for a given content, or collection thereof, is referred to as a "progress bar". The indicator(s) of one or more positions within a video may take any form, such as a caret, a time mark, a frame of content, a content thumbnail, a combination thereof, or otherwise. Herein and regardless of form used, each such indicator is commonly referred to as an "indicator."

Yet, the above mentioned and other available user interface options do not facilitate user progression through a given, collection thereof, or one or more portions thereof, based on a user's corresponding movement of their finger on a touchpad, touch surface, or otherwise. Such movements, as often being provided and presented relative to a progress bar, are also not currently provided. Currently available user interface options do not facilitate touch or similar movements by a user on a touch interface as corresponding to movements of an indicator relative to a progress bar and a corresponding progression of the given content as represented, for example, as video on a display, thumbnails on a progress bar, one or more thumbnails presented relative to the progress bar, verbal content cues, or otherwise. Further, currently available user interface options do not facilitate progression through content relative to a progress bar, at variable rates, such as at a slow scrub, a fast scrub, a slow swipe, a fast swipe, or otherwise (such rates being defined below). Accordingly, devices, systems and processes which address the above and other deficiencies are needed.

SUMMARY

The various embodiments of the present disclosure describe devices, systems, and processes for facilitating user adaptive progressions through content. The various embodiments facilitate a desired progression through two or more portions of a given content, a collection of content, or other arrangements and portions of content. More specifically, the various embodiments describe devices, systems and processes for facilitating user adaptive progressions through content by use of touchpads and similar user interfaces. Even more specifically, the various embodiments describe devices, systems and processes for facilitating smooth progressions of video and audio-video content as represented by two or more thumbnails presented on a progress bar.

For at least one embodiment of the present disclosure, a process for facilitating user adaptive progressions through content, may include receiving a detected first user input motion and determining, based on the first user input motion, a first progression type. For at least one embodiment, the user input motion may be detected by a touchpad of a remote control device. For at least one embodiment, the first progression type may be a power function of a scaled content duration remaining gL between a current location C in the content and an end location E for the content. For at least one embodiment, the first progression type may be a function of a scaling constant and the scaled content duration remaining gL raised to a power constant P.

For at least one embodiment of the present disclosure, a process for facilitating user adaptive progressions through content may include receiving executing a slow scrub progression through the content when the first user input motion occurs within a first area defined by: a first velocity threshold VT1 upper limit; and a first array sector range AS1. For at least one embodiment, the first progression type may be a linear function of a scaled content duration remaining gL between a current location C in the content and an end location E for the content. For at least one embodiment, the first progression type may be a function of an adjustment content R subtracted from a product of the scaled content duration remaining gL and a scaling constant F.

For at least one embodiment of the present disclosure, a process for facilitating user adaptive progressions through content may include executing a slow scrub progression through the content when the first user input motion occurs within a first area defined by a first velocity threshold VT1 upper limit and a first array sector range AS1.

For at least one embodiment of the present disclosure, a process for facilitating user adaptive progressions through content may include executing a fast scrub progression through the content when the first user input motion occurs within a second area defined by a second velocity threshold VT2 upper limit and a second array sector range AS2.

For at least one embodiment of the present disclosure, a process for facilitating user adaptive progressions through content may include executing a slow swipe scrub progression through the content when the first user input motion occurs within a third area defined by a third velocity threshold VT3 upper limit, and a third array sector range AS3.

For at least one embodiment of the present disclosure, a process for facilitating user adaptive progressions through content may include executing a fast swipe progression through the content when the first user input motion occurs within a fourth area defined by a fourth velocity threshold VT4 upper limit, and a fourth array sector range AS4.

For at least one embodiment of the present disclosure, a process for facilitating user adaptive progressions through content may include progressing through the content to an intermediate location I. For at least one embodiment, the intermediate location I may be a function of the current location C and a step size Z. For at least one embodiment, the step size Z may be a function of a shift factor S plus a velocity factor V exponentially raised to a power based on the scaled content duration remaining gL.

For at least one embodiment of the present disclosure, a process for facilitating user adaptive progressions through content may include use of one or more of a first shift factor S1 and a first velocity factor V1 for a slow scrub progression, a second shift factor S2 and a second velocity factor V2 for a fast scrub progression, a third shift factor S3 and a third velocity factor V3 for a slow swipe progression, a fourth shift factor S4 and a fourth velocity factor V4 for a fast swipe progression. For at least one embodiment, at least one of the first shift factor, the second shift factor, the third shift factor and the fourth shift factor may have a unique value. For at least one embodiment, at least one of the first velocity factor, the second velocity factor, the third velocity factor and the fourth velocity factor may have a unique value.

For at least one embodiment and when one of the slow swipe progression and the fast swipe progression are executed, the process may include decelerating the progression through the content from a first intermediate location to a determined location D. For at least one embodiment, the decelerating occurs based on two or more deceleration factors Q. For at least one embodiment, the two or more deceleration factors Q may be determined based on an arc tangent curve.

In accordance with at least one embodiment of the present disclosure, a device, for facilitating user adaptive progressions through content may include a hardware processor configured to execute non-transient computer instructions for adaptively progressing through content based upon a determined progression type.

For at least one embodiment, a device, for facilitating user adaptive progressions through content may include an input/output device configured to communicatively couple the hardware processor with a user input device. The user input device may be configured to capture a user input action, convert the user input action into user input data, and output the user input data. For at least one embodiment, the user input action may be captured using a touchpad.

For at least one embodiment, a device, for facilitating user adaptive progressions through content may be configured to execute a progression type. The progression type may be at least one of a slow scrub, a fast scrub, a slow swipe and a fast swipe.

For at least one embodiment, a device for facilitating user adaptive progressions through content may be configured to execute non-transient computer instructions for utilizing a determined progression type to facilitate an adaptive progressing through content from a current location C in the content to a determined location D in the content.

For at least one embodiment, a device for facilitating user adaptive progressions through content may be configured to facilitate the adaptive progressing through content from a current location C to a determined location D by determining at least one intermediate location I. The intermediate location I may be a function of the current location C and a step size Z. The step size Z may be a function of a scaled content duration remaining gL.

In accordance with at least one embodiment of the present disclosure, a system for facilitating user adaptive progression through content may include a display configured to present content to a user. The system may further include a remote configured to capture a user input action, convert the user input action into user input data, and output the user input data. The system may further include a hardware processor, communicatively coupled to each of the display and the remote, configured to execute non-transient computer instructions for: determining based on the user input data received from the remote a progression type; and progressing through the content based upon a determined progression type.

For at least one embodiment, a system for facilitating user adaptive progression through content may include a remote configured to capture the user input action on a touchpad. The user input action may correspond to a progression type selected from at least one of a slow scrub, a fast scrub, a slow swipe, and a fast swipe. The progression type may be determined based upon at least one of a velocity threshold, a velocity range, and an array sector range. Each of the velocity threshold, the velocity range, and the array sector range may be specified based upon the user input action captured on the touchpad.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1:
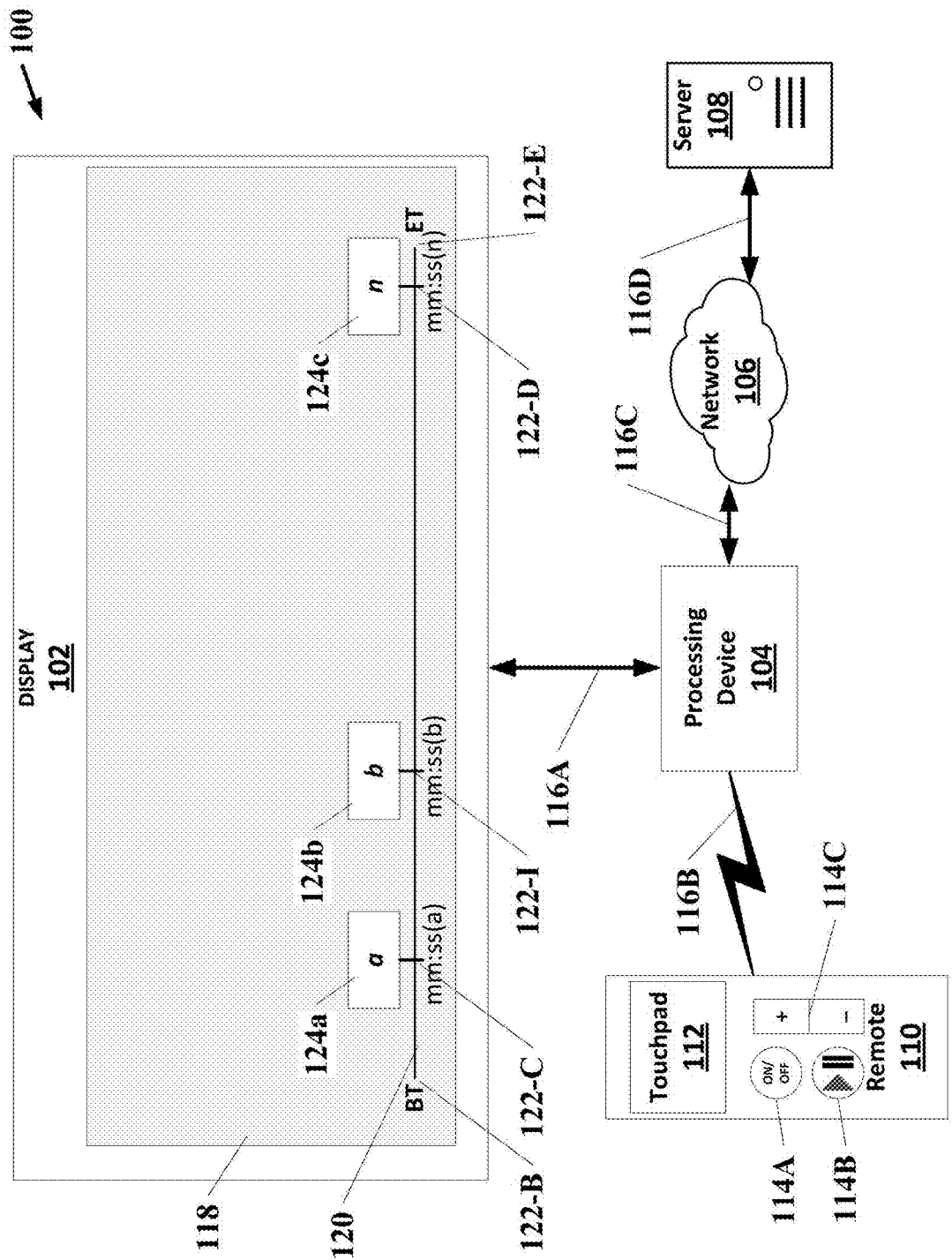
FIG. 1 is a schematic representation of a system for use in facilitating user adaptive progressions through content and in accordance with at least one embodiment of the present disclosure.

The various embodiments described herein are directed to devices, systems, and processes for facilitating user adaptive progressions through content. More specifically, the various embodiments described herein relate to devices, systems and processes for facilitating progressions through content by use of touch and similar user interfaces. Even more specifically, the various embodiments described herein relate to devices, systems and processes for facilitating adaptive progressions through video content, while various locations in such content are represented by a progress bar and one or more portions of such content are presented on a display.

As used herein, "content" commonly refers to any form of information that can be segmented, with two or more of the portions thereof being presentable in a humanly perceptible form. Non-limiting examples of content include still images, graphical images, frames (singularly or collectively) of videos and regardless of source or means of distribution, audio tracks, audio-video synchronized content, documents, web pages, or any other humanly perceptible content or collection thereof that can be and/or has been defined into two or more portions. As used herein, "content" by extension includes the data (non-humanly perceptible) form of otherwise humanly perceptible information. Such data forms may be communicated, provided, stored, processed, or otherwise manipulated and/or manipulatable by processors executing one or more computer instructions, as performed by one or more devices, systems and/or processes.

Further, as used herein, content can be hierarchically sub-divided into portions. For example, content can be delineated into a hierarchy (e.g., in an order from broad to narrow) of "segments", "frames" and "elements." Other hierarchical arrangements may be used to apportion content.

For a non-limiting example where a Motion Pictures Expert Group (MPEG) encoded video is a given content, such MPEG video may be apportioned, or otherwise delineated, into a hierarchy of ever greater granularity. For example, an MPEG video may be hierarchically arranged as: a sequence, of multiple groups of pictures (GOP), where each GOP includes multiple slices, where each slice includes multiple macroblocks, and where each macroblock includes multiple blocks, i.e., sequence→GOPs→slices→macroblocks→blocks. For at least one embodiment of the present disclosure, a similar, non-limiting hierarchy may be used.

For at least one embodiment and as used herein for illustrative purposes of description and explanation only, a content may be apportioned hierarchically, as follows: "content"→"segments"→"frames"→"elements." For another non-limiting example, a given content can be a document, that can be apportioned hierarchically, as follows: "file name"→chapter→page→paragraph→sentence→word. Other hierarchical arrangements, other data structures, and relationships may be used to apportion content to facilitate user adaptive progression therethrough and in accordance with one or more embodiments of the present disclosure.

As used herein, "real-time" refers to a progression through portions of a given content at a rate intended by a content originator. Non-limiting examples of content originators include authors, producers, distributors, aggregators, editors, or other with respect to a given content. For at least one embodiment, a progression through portions of a given content occurs from a current location "C", through one or more intermediate locations "I", until a determined location "D" is reached. The content may be defined to include a beginning location "B" and an end location "E". Each of these locations correspond to a given, uniquely identifiable location within the given content, at a desired hierarchical level, and at a given time. The determined location D may arise after or before an initial current location C and may correspond to a last intermediate location I, as determined for a given user instructed progression through the content. As the progression occurs with the user's input action, the current location C may be successively updated to each of the one or more intermediate locations I and, ultimately, to the determined location D. It is to be appreciated that a touchpad and related electronics may perform multiple intermediate location I determinations to arrive at the determined location D.

A progression may occur in a "forward" or a "reverse" direction relative to a sequencing, e.g., by time or frame number, or other arrangement of portions of the content, as such content is provided by a content originator. The current location C may be any location within the content. For at least one embodiment, the current location C updates as a progression through the given content proceeds. The current location C may be designated by time, position, or otherwise. For at least one embodiment, the current location C may be designated on a progress bar and may be user selectable. The determined location D may be any identifiable location in a given content at which a given user instructed progression ends. The determined location D may correspond to the beginning location B (for a reverse progression through all of the content) or the end location E (for a forward progression through all of the content) when a corresponding user input instruction, or sequence thereof, is received by a processing device (as further described below).

For at least one embodiment, during a progression through content proceeds stepwise from a then arising current location C to an intermediate location I in the content. For at least one embodiment, the intermediate location I is a function of the current location C and a step size Z. This relationship may be expressed mathematically, as in Equation 1, where an absolute value for an intermediate location I is defined. It is to be appreciated that the value of I may be positive for a forward progression through content and negative for a reverse (backward) progression through content.

$$I=C+Z;\qquad\text{Equation 1}$$

wherein:
I is the intermediate location;
C is the current location; and
Z is the step size
(wherein, Z has a positive value for forward progressions and negative value for reverse progressions).

For at least one embodiment, the step size Z is a function of one or more of a length "L" of the given content, a duration scaling factor g, a shift factor "S", and a velocity factor "V". For at least one embodiment, the step size is defined by Equation 2.

$$|Z|=S+Ve^{Lg}\qquad\text{Equation 2}$$

wherein:
Z is the step size;
S is the shift factor;
V is the velocity factor;
L is the content duration remaining (for a given direction of progression); and
g is the duration scaling factor.

It is to be appreciated that one or more of the duration scaling factor g, the shift factor S and/or the scaling factor V used in Equation 2 may vary based upon user, user interface device used, type of content, size of display (or other human interface device) used to present the content, and otherwise. The shift factors and scaling factors may be determined based on experimental results, actual use, user preferences and otherwise. Supervised and/or unsupervised learning techniques may be used to determine one or more shift factors and/or scaling factors.

As used herein, a "slow scrub" is a user action seeking to advance through portions of content at a rate that is slower than a real-time rate. For at least one embodiment, a slow scrub includes a progression through content portions on an element-by-element basis. For example, a slow scrub of an MPEG encoded video may include advancing on a picture-by-picture basis, where changes in portions of each frame in the video, e.g., as provided by a macroblock, is presented on one or more of the progress bar and/or a corresponding video display. Similarly, a slow scrub of a document may include a progression on a sentence-by-sentence basis through portions of a document. It is to be appreciated that a slow scrub for a first given content may vary in form, timelines, or otherwise from a second slow scrub for the same content or for a second given content.

For a slow scrub, a slow scrub shift factor $S_1$ and a slow scrub velocity factor $V_1$ may be used in Equations 1 and 2 to calculate the step size Z and each intermediate location I that ultimately results in progression to a determined location D. For at least one embodiment, one or more of the slow scrub shift factor and the slow scrub scaling factor result in a progression through portions of content until the determined location D is reached that corresponds on a one-to-one basis between a last sensed position of a user's finger along a progress bar, as sensed on a touch surface or other positional indicator. Further, a then co-located element or other desired delineator of content, may be presented on a progress bar and/or on a corresponding display or otherwise presented in a humanly perceptible form. For at least one embodiment, during a slow scrub each intermediate location I calculated is determined to correspond to a determined location D.

Figure 3A:
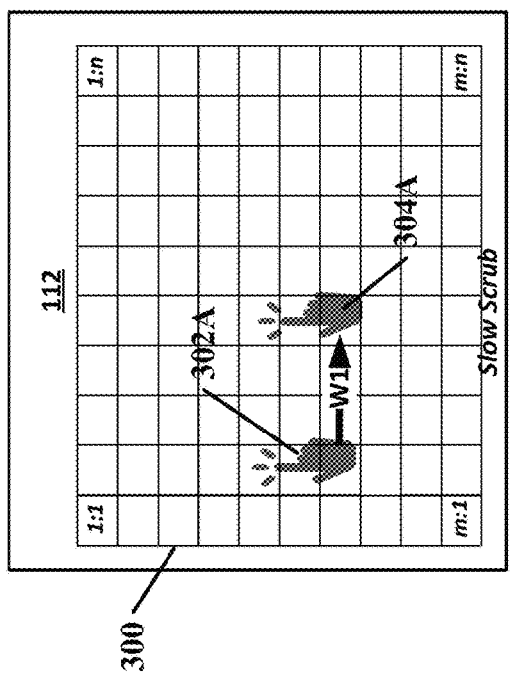
FIG. 3A is an illustrative representation of a slow scrub user input, as provided using a touchpad of the remote shown in FIG. 1, and in accordance with at least one embodiment of the present disclosure.

As shown in FIG. 3A, a slow scrub may be instructed by a user, using for example, a surface of a touchpad 112 of a remote 110 (as such devices are further described below with reference to FIG. 1). The touchpad 112 may include an array 300 of multiple sectors 300m:n. As illustrated, a slow scrub may be instructed by a user's deliberate movement of their finger (or other similar indications) across the touchpad sectors 300m:n. For a slow scrub, the user's finger activates only a few array sectors, within a given (typically brief) time period. For at least one embodiment, the time period during which a user provides a slow scrub instruction may be within 1 to 5 seconds.

Figure 6:
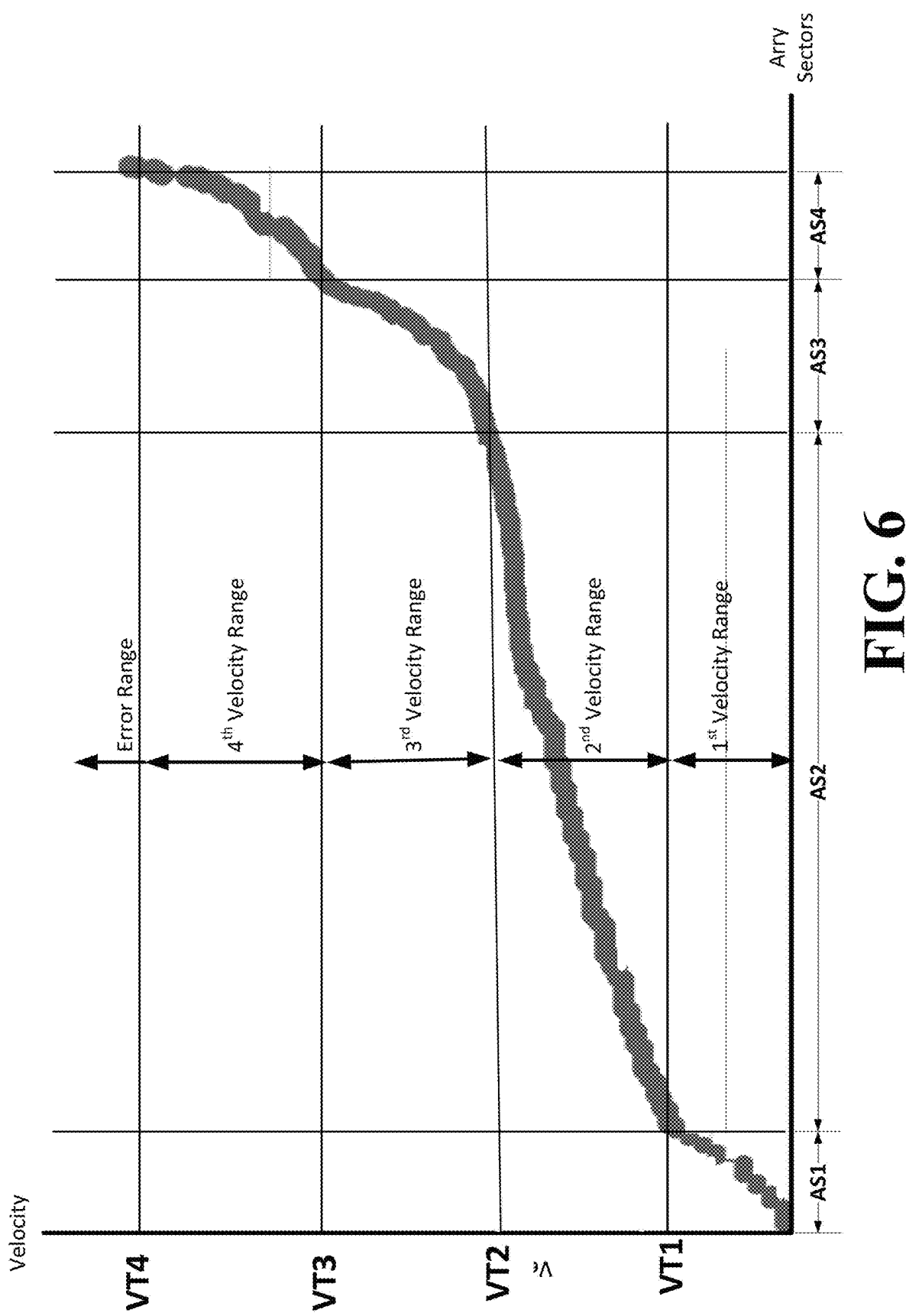
FIG. 6 is a graphical representation of variances between types of user inputs and in accordance with at least one embodiment of the present disclosure.

As shown in FIG. 6, a user's movement across a touchpad array may be defined as a progression type "T" that corresponds to one or more velocity thresholds. For example, a first velocity threshold VT1 may specify an upper limit for slow scrub user inputs, a second velocity threshold VT2 may specify an upper limit for fast scrub user inputs, a third velocity threshold VT3 may specify an upper limit for slow swipe user inputs, and a fourth velocity threshold VT4 may specify an upper limit for fast swipe user inputs. User inputs arising above the fourth velocity threshold VT4 may specify erroneous signals and may lead to uncontrolled progressions through the content. It is to be appreciated that velocity ranges arising between the velocity thresholds VT1, VT2, VT3 and VT4 may also be used to specify a progression type T. Further, the velocity thresholds, as shown in FIG. 6, may not be equally spaced, may arise along an exponential or other curve, and may vary from embodiment to embodiment, based on device utilized, based on user preferences or otherwise.

As further shown in FIG. 6, a progression type T may correspond to one or more array sector ranges. For example, a first array sector range AS1 may specify a range for slow scrub user inputs, a second array sector range AS2 may specify a range for fast scrub user inputs, a third array sector range AS3 may specify a range for slow swipe user inputs, and a fourth array sector range AS4 may specify a range for fast swipe user inputs. For at least one embodiment the differences between the value ranges is used in determine progression type T and not an actual position along a touchpad or other user input device at which any given array sector occurs. For at least one embodiment, each of a velocity threshold and an array sector range are used in identifying a progression type T as requested by a user using a touchpad or other user input device.

For at least one embodiment, a progression type T may be determined in view of one or more constants, such as a scaling constant "B", a power constant "P", and an adjustment constant "R." The constants may be specified for each range of progression type T or expressed mathematically using one or more exponential functions.

More specifically and for at least one embodiment, a progression type T may be defined by a power function and/or a linear function. An exemplary power function is provided in Equation 3 and an exemplary linear function is provided in Equation 4. For at least one embodiment, a power function may be used to define a slow scrub progression type and a linear function may be used to define each of a fast scrub, a slow swipe and a fast swipe progression type.

$$T=F(gL)^P \qquad \text{Equation 3}$$

where: T is the progression type;
F is a scaling constant;
L is the duration of remaining content (as determined based on a current location and a requested direction of progression to either a beginning location B or an end location E in the content);
g is the duration scaling factor; and
P=power constant.

$$T=F(gL)-R \qquad \text{Equation 4}$$

where: T is a progression type;
F is a scaling constant; and
R is an adjustment constant.

For at least one embodiment, one or more constants used in defining a first progression type may vary when used to define a second progression type. Such scaling constants, power constants and adjustment constants may be experimentally determined for each velocity threshold, velocity range, and/or array sector range. For at least one embodiment, constants and other variables used in Equations 1-4 may vary with each type of touchpad (or other user input device) utilized, type of content, and otherwise.

As shown in FIG. 6, a slow scrub user input may be graphically represented by those user inputs arising within one or more of: a first velocity range, i.e., less than the first velocity threshold VT1; user inputs arising within the first array sector range AS1; or a combination of the first velocity range and the first array sector range.

As used herein, a "fast scrub" is a user action seeking to advance through portions of content at a substantially constant rate that is faster than real-time, but without diminishing a user's contextual understanding of content portions progressed through. For a non-limiting example, a fast scrub of an MPEG encoded video may include a progression on a GOP basis. For at least one embodiment and during a fast scrub of MPEG encoded content, a user's ability to perceive contextual information from each MPEG "I" frame may be maintained, while fine details provided in "B" and "P" frames, or other elements thereof, may not be immediately perceivable. As compared to a slow scrub, where elements of frames are humanly perceptible and the progression may occur on a picture-by-picture basis, slice-by-slice, or even block-by-block basis (if so desired), for at least one non-limiting embodiment, a fast scrub of an MPEG encoded video progresses on at least a GOP basis. It is to be appreciated that a fast scrub for a first given content may vary in form, timelines, or otherwise from a fast scrub for a second given content. Similarly, a fast scrub of textual information, such as that provided in a legal document, may include facilitating a presenting of portions of such content on a page-by-page basis, or otherwise.

For a fast scrub, a fast scrub shift factor $S_2$ and a fast scrub velocity factor $V_2$ may be are used in Equation 2. For at least one embodiment, one or more of the fast scrub shift factor $S_2$ and the fast scrub velocity factor $V_2$ may result in a progression through content portions until a determined location D is reached.

For at least one embodiment, a fast scrub progression for a content duration L of 60 minutes may correspond to a progression through twelve minutes of real-time content in one second of "actual time". Where the actual time is the user's perceived time, as determined for example, using a clock synchronized to an atomic clock or other universal time designator. Similarly, for a content duration L of 3 hours, a fast scrub may correspond to a progression through 36 (thirty six) minutes of real-time content in one second of actual time. Similarly, for a content duration L of one minute, a fast scrub progression would correspond to a progression through twelve (12) second of real-time content in one second of actual time. It is to be appreciated that a progress bar representation of an entirety of a content's portions may vary based on the display size used, the length of the content and other factors. It is to be appreciated that an actual number of given portions of content advanced using any embodiment of the present disclosure may vary by device used and content then presented.

For at least one embodiment, during a fast scrub, a predetermined number of intermediate locations I are identified on a progress bar while the content progresses to the determined location D. For at least one embodiment and for a fast scrub progression through an MPEG video, the number of intermediate locations I identified varies based on the content duration L.

Figure 3B:
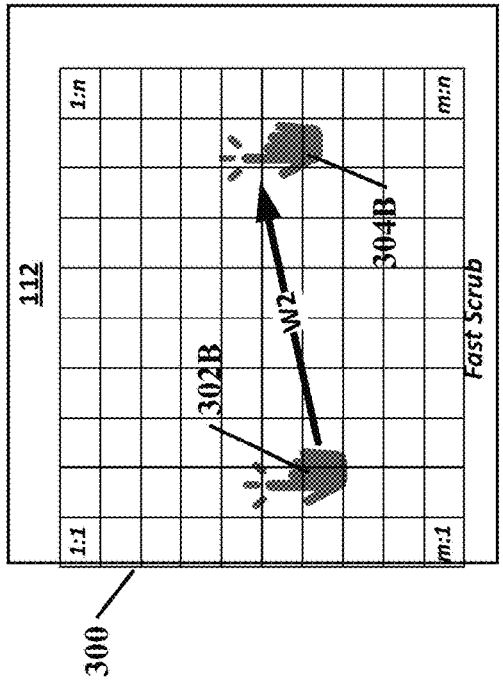
FIG. 3B is an illustrative representation of a fast scrub user input, as provided using a touchpad of the remote shown in FIG. 1, and in accordance with at least one embodiment of the present disclosure.

As shown in FIG. 3B, a fast scrub may be instructed by a user, using for example, the surface of the touchpad 112 of the remote 110. As illustrated, a fast scrub may be instructed by a user's sustained movement of their finger (or other similar indications) across the touchpad sectors 300m:n at a rate that is substantially constant for at least one seconds. For at least one embodiment, the time period during which a user provides a fast scrub instruction may be between than 5 and 10 seconds. As compared to the slow scrub, during a fast scrub a larger number of array sectors are activated over a given, substantially constant velocity range.

As shown in FIG. 6, a fast scrub user input may be graphically represented by those user inputs arising within one or more of: a second velocity range, i.e., greater or equal to the first velocity threshold VT1 and less than the second velocity threshold VT2; user inputs arising within the second array sector range AS2; or a combination of the second velocity range and the second array sector range.

As used herein, a "slow swipe" is a user action seeking to advance through a video at a rate that is substantially faster than real-time and with a user maintaining a limited and intermittent contextual perception of content then being progressed through. For at least one embodiment, a slow swipe progresses through the content on a segment-by-segment basis. During a slow swipe, a user is periodically updated as to the relative content available in the given content and as to their relative position within such content. It is to be appreciated that a slow swipe for a first given content may vary in form, timelines, or otherwise from a slow swipe for a second given content.

For a non-limiting example, a slow swipe of an MPEG encoded video may include progressing through the video on a MPEG sequence basis. For another non-limiting example, a slow swipe progression through a TV program may include progressing on a basis other than those defined by an encoding or other methodology used with respect to a given content. For example, a progression may proceed by presenting an MPEG "I" frame arising after each preselected event, such as after each commercial break, or after a predetermined time interval, such as after every "n" minutes (or seconds) of program time, on a chapter-by-chapter basis, or using any other desired delimiter of content.

For at least one embodiment, a slow swipe progression through video content will commonly result in a progression through the video content at a rate commonly associated with a 60× fast forward speed on a digital video recorder (DVR). For at least one embodiment, a slow swipe progression through textual information, such as information provided in a novel, may include presenting a first page of each chapter, or otherwise.

Figure 3C:
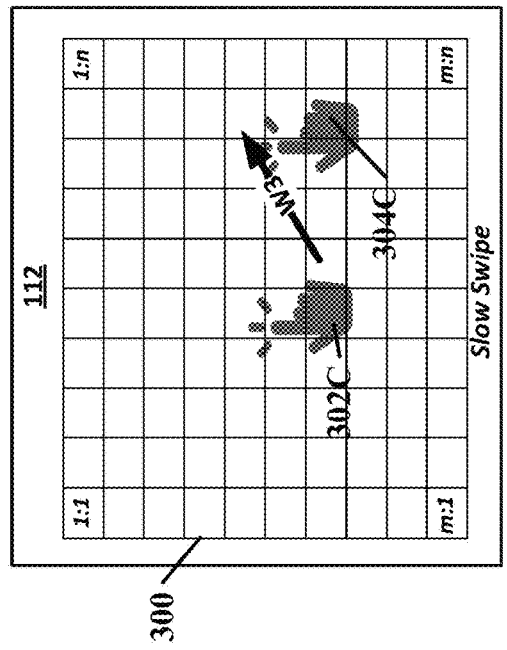
FIG. 3C is an illustrative representation of a slow swipe user input, as provided using a touchpad of the remote shown in FIG. 1, and in accordance with at least one embodiment of the present disclosure.

For a slow swipe, a slow swipe shift factor $S_3$ and a slow swipe velocity factor $V_3$ may be used in Equation 2. For at least one embodiment, use of one or more of the slow swipe shift factor $S_3$ and the slow swipe velocity factor $V_3$ may result in a progression through a given content until a determined location is reached that corresponds on a predetermined basis between a last sensed position of a user's finger along a touchpad and as represented on a progress bar, with a then presented frame or other delineator of content, as presented on a corresponding display. The predetermined basis may be determined based on actual device testing, modeled based on a number of array sectors provided by a given touchpad, and otherwise. For at least one embodiment, during a slow swipe a predetermined number of intermediate locations may be identified on a progress bar while the content progresses to the determined location. For at least one embodiment, the predetermined number of intermediate locations identified on a progress bar during a slow swipe may vary based on the touchpad used. As shown in FIG. 3C, a slow swipe may be instructed by a user, using for example, the surface of the touchpad 112 of the remote. For at least one embodiment, a slow swipe may be instructed by a user's swift and brief progression of their finger across the touchpad sectors 300$m$:$n$. For at least one embodiment, the time period during which a user provides a slow swipe instruction may be less than one (1) second. As compared to the fast scrub, a slow swipe instruction occurs when a user's finger moves across the touchpad on a faster basis and with fewer sector arrays being activated.

As shown in FIG. 6, a slow swipe user input may be graphically represented by those user inputs arising within one or more of: a third velocity range, i.e., greater or equal to the second velocity threshold VT2 and less than the third velocity threshold VT3; user inputs arising within the third array sector range AS3; or a combination of the third velocity range and the third array sector range.

As used herein, a "fast swipe" is a user action seeking to advance through a substantial portion of a video, and at a rate such that a progression through an entirety of a video, regardless of length, may occur with use of only a limited number of swiping actions. During a fast swipe, user perception of the content arising between a current location and a determined location may be diminished and content corresponding to portions progressed therethrough may not be presented to the user on a progress bar, display or otherwise.

For a non-limiting MPEG video example, a fast swipe may include progressing through an MPEG encoded video at a rate such that five swipes of a user's finger (or other user input action) results in each swipe progressing through $\frac{1}{5}^{th}$ of any content available (in a given direction) from the current location C to either the beginning location B (for a reverse progression) or the end location E (for a forward progression). It is to be appreciated, that the size of the $\frac{1}{5}^{th}$ of content through which each fast swipe progression progresses may vary with the overall content length L, the direction of travel of the user's finger relative to the touchpad (or other user input), and the current location C in the content when the fast swipe instruction is received from the user.

Figure 3D:
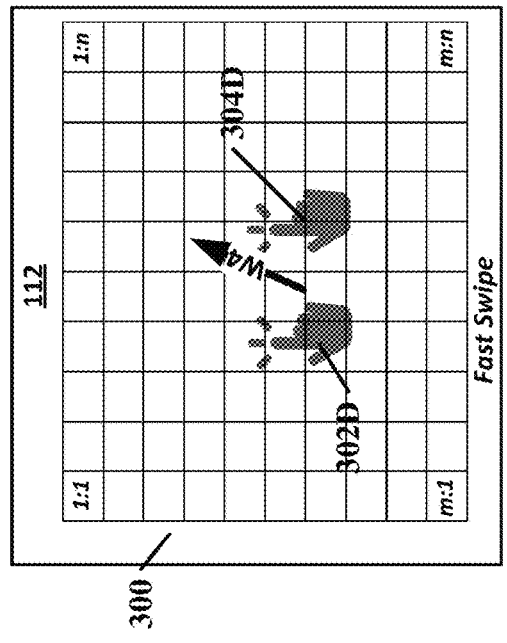
FIG. 3D is an illustrative representation of a fast swipe user input, as provided using a touchpad of the remote shown in FIG. 1, and in accordance with at least one embodiment of the present disclosure.

As shown in FIG. 3D, a fast swipe may be instructed by a user, using for example, the surface of the touchpad 112 of the remote. For at least one embodiment, a fast swipe may be instructed by a user's rapid and abrupt progression across the touchpad sectors 300$m$:$n$. For at least one embodiment, the time period during which a user provides a fast swipe instruction may within 0.1 and 0.05 seconds. As compared to the slow swipe, a fast swipe occurs on an even faster basis and with even fewer sector arrays being activated over a given velocity range.

More specifically and for at least one embodiment of the present disclosure, a series of five, successive fast swiping actions may be used to instruct a device to progress through a given content from any current location C to a desired beginning location B or ending location E. For at least one embodiment, and during a fast swipe, a user may not be able to perceive contextually, or otherwise, content that is being fast swipe progressed through (effectively skipped over) while the fast swipe progression is occurring. For at least one non-limiting embodiment, during a fast swipe the user may be presented with indicators on a progress bar which represent the relative location of the progression through the content, such indicators may be associated with each fast swipe user input action. Such indicators may not provide any context for the content being progressed through.

For a fast swipe, a fast swipe shift factor $S_4$ and a fast swipe velocity factor $V_4$ may be used in Equation 2. For at least one embodiment, one or more of the fast swipe shift factor and the fast swipe velocity factor may result in a progression through a given content until a determined location D is reached that corresponds on the above mentioned $\frac{1}{5}^{th}$ of total content progressable basis. When a deceleration (as described below) is used, one or more intermediate locations I may be identified on the progress bar.

As shown in FIG. 6, a fast swipe user input may be graphically represented by those user inputs arising within one or more of: a fourth velocity range, i.e., greater or equal to the third velocity threshold VT3 and less than the fourth velocity threshold VT4; user inputs arising within the fourth array sector range AS4; or a combination of the fourth velocity range and the fourth array sector range.

As used herein, a "deceleration" refers to a slowing of a progression through content from an initial progression rate to one or more slower progression rates. For at least one embodiment, a deceleration may include one or more changes in a rate of progression through a given content, for example, from a fast swipe rate to a slow swipe rate until a determined location is reached. For at least one embodiment, a deceleration may include one or more changes in a rate of progression through a given content from, for example, a fast swipe rate to a fast scrub rate until a determined location is reached. For at least one embodiment, a deceleration may include one or more changes in a rate of progression through a given content from, for example, a fast swipe rate to a slow scrub rate until a determined location is reached. For at least one embodiment, a deceleration may include one or more changes in a rate of progression through a given content from, for example, a slow swipe rate to a fast scrub swipe rate until a determined location is reached. For at least one embodiment, a deceleration may include one or more changes in a rate of progression through a given content from, for example, a slow swipe rate to a slow scrub rate until a determined location is reached. For at least one embodiment, a deceleration may include one or more changes in a rate of progression through a given content from, for example, a fast scrub rate to a slow scrub rate until a determined location is reached.

Figure 7:
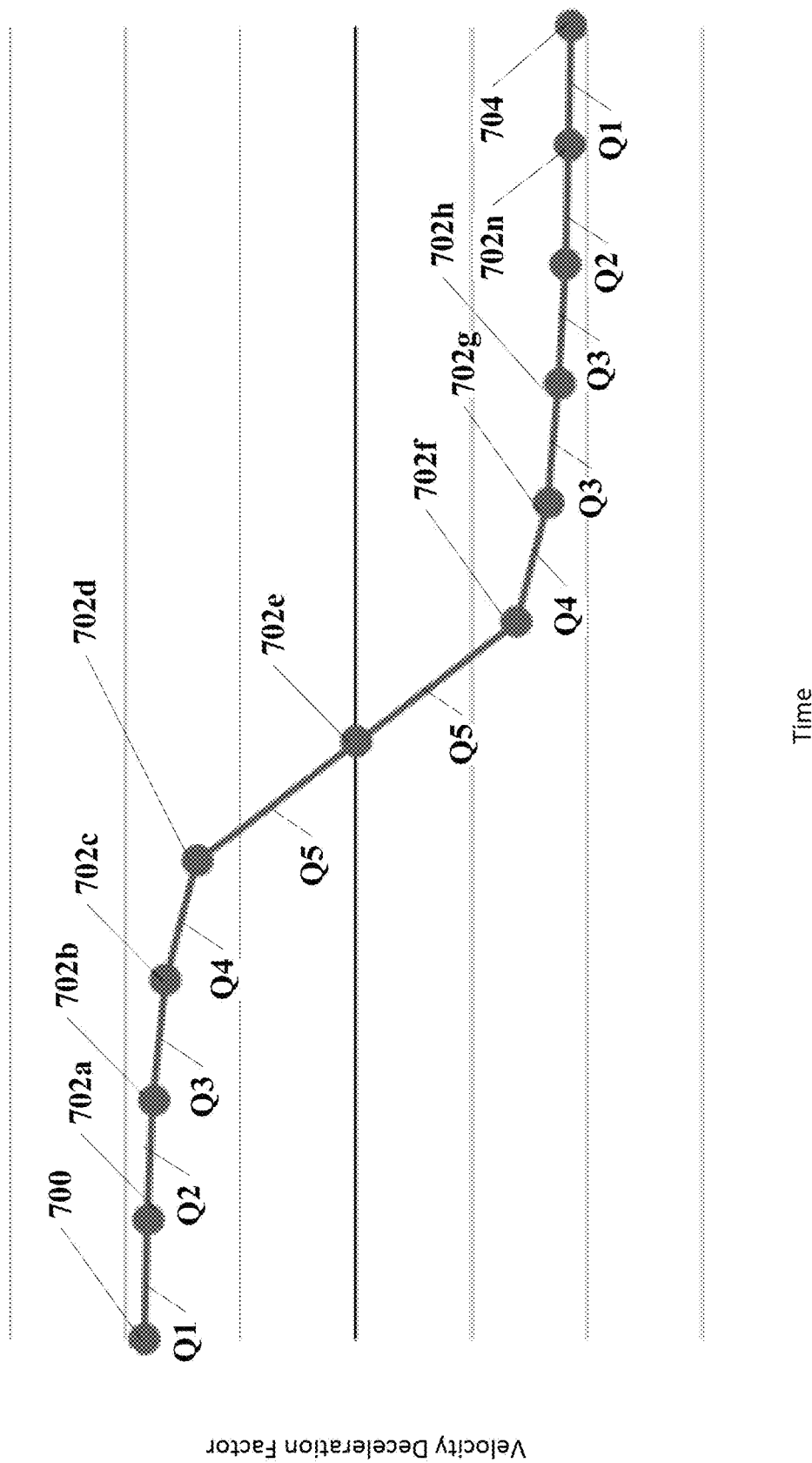
FIG. 7 is a graphical representation of a deceleration of a progression from a faster rate to a slower rate and prior to reaching of a determined location and in accordance with at least one embodiment of the present disclosure.

As shown in FIG. 7, a graphical representation of a deceleration of a progression from an intermediate location 700, through two or more second intermediate locations 702a-702n, to a determined location 704 and where the rate of progression changes from the intermediate location 700, through the two or more second location 702a-n, and until the determined location 704 is reached. In accordance with at least one embodiment of the present disclosure such deceleration may include the use of two or more deceleration factors, such as a first deceleration factor Q1, a second deceleration factor Q2, a third deceleration factor Q3, a fourth deceleration factor Q4, and a fifth deceleration factor Q5. The deceleration factors are graphically illustrated in FIG. 7 by the corresponding slopes between the various intermediate locations. The use of a given deceleration factor may vary over time. It is to be appreciated that any deceleration factor may be used, that a deceleration may occur linearly, parabolically, exponentially, or otherwise.

For at least one embodiment, a deceleration of a progression may proceed using a portion of an arc tangent such as a portion formed from an inverted curve defined by second locations 702e, 702f, 702g and 702n.

For at least one embodiment, a deceleration may be determined based on a determined deceleration time window and not on the determined location 704. More specifically, an arc tangent function may be used to specify the one or more second locations 702 within the deceleration time window. For at least one embodiment, a predetermined time interval between each second location 702 may be utilized, such as 0.005 seconds. Further, a deceleration time window may include a predetermined number of intervals, such as 32 intervals, between each of the intermediate location 700, the second locations 702, and the determined location 704. An arc tangent curve may be used to determine a distance to progress through the content for each interval.

As shown in FIG. 1 and for at least one embodiment of the present disclosure, a system 100 for facilitating user adaptive progressions through content may include a display 102. The display 102 may be any device or collection thereof capable of presenting humanly perceptible information. For at least one embodiment, a display 102 is configured to present visible information and non-limiting examples thereof include televisions, video projectors, displays on smartphones, tablets, computers, and the like, display glasses, and otherwise. The display 102 may include other forms of devices for present humanly perceptible information including, but not limited to, audible devices, motion devices, and otherwise. The display 102 may be configured to present content in a content area 118, while presenting a progress bar 120 thereon. A beginning location indicator 122-B may be used to identify a first frame of the content. A current location indicator 122-C may be used to identify a current location of content being presented in the content area 118. One or more intermediate location indicators 122-I may be used. A determined location indicator 122-D may be presented on the progress bar. An end location indicator 122-E may be presented on the progress bar 120. It is to be appreciated that as a user progresses through the content, the location of one or more of the indicators 122 on the progress bar 120 may change. One or more thumbnail images 124a-n may be used and may correspond to one or more of the location indicators 122. It is to be appreciated that, for at least one embodiment, only a single thumbnail 124 is presented on the display 102 at any given time. For at least one embodiment, multiple thumbnails 124 may be presented on the display 102 at any given time. One or more of the thumbnails (when presented) may correspond to locations other than one of the location indicators 122 for the then displayed content in content area 118.

As further shown in FIG. 1, the system 100 includes a processing device 104. As used herein, a processing device is generally any device configured for receiving content and processing such content for presentation on a display 102 to a user proximate thereto. The content and/or user interfaces presented are presented for use with a "processing UI." For at least one embodiment, a processing device 104 may be a processing Device that is configured for use with a "10-foot UI" as commonly defined. For purposes of explanation only and not by limitation, one definition for a "10-foot UI" is, "[a] user interface for a TV set. The '10 foot' is used to differentiate it from a desktop computer screen that is typically less than two feet from the viewer's eyes. Designed to be operated by a handheld remote control, the 10-foot user interface (UI) has extra-large buttons and menu text that are easily navigated." Non-limiting examples of a processing Device include any of a plurality of digital media player devices including, but not limited to, ROKU®, AMAZON FIRE TV®, Chromecast®, LG TV®, SAMSUNG SMART TV®, and APPLE TV®, and other devices.

For at least one embodiment, devices other than processing devices may be used as the processing device 104 to receive and process content for presentation on a display. For at least one embodiment, the processing device 104 device may be provided within a same packaging as the display 102, such as within a smartphone, a tablet, a television, or otherwise.

As further shown in FIG. 1, the processing device 104 may be communicatively coupled to the display 102 by a first communications link 116A. The first communications link 116A may include the use of any currently available and/or later arising wired and/or wireless communications links including, but not limited to, Bluetooth, WiMAX, local area network (LAN) connections, and otherwise.

As further shown in FIG. 1, the processing device 104 may be communicatively coupled to a remote control device (a "remote") 110 by a second communications link 116B. The second communications link 116B may use any desired currently known and/or later arising communications technology. The remote 110 may include one or more user interfaces, such as one or more control buttons 114A and 114B, volume buttons 114C, and a touchpad 112 or similar device. More specifically and with respect to at least one embodiment, the remote 112 may include a touchpad 112 or other form of user interface capable of converting a user's input indicative of a desired progression through content into computer processable data. Non-limiting examples of such user interfaces include capacitive touchpads and touch screens (such as those provided on a smartphone, a tablet, or otherwise), accelerometers (such as those provided on gaming devices, and otherwise), and other gesture recognition devices. As discussed herein, the remote 110 is configured to convert a user's progression inputs instructions, as the appropriate, into one or more computed executable instructions for the processing device 104 to execute. Such user input instructions and corresponding computer executable instructions provided by the remote 110 to the processing device 104 include at least one a slow scrub instruction, a fast scrub instruction, a slow swipe instruction, and a fast swipe instruction. It is to be appreciated that the granularity of a given user's action, as sensed and interpreted by a given remote, may vary by remote type and each device. Experimental testing, machine learning, and other processes may be used to tune a remote 110 and/or the processing device 104 to correlate user input progression instructions into specific computer executable progression instructions. For at least one embodiment, the remote 110 may be configured to receive "touches," as detected by one or more array sector activations, to the processing device 104 which provides any processing thereof needed to convert the sensed user touches into user inputs instructions corresponding to a then desired progression type T. For at least one embodiment, a touchpad 112 may have a granularity for detecting user touches comparable to that of the 4$^{th}$ Generation APPLETV remote, as provided by Apple, Inc. of Cupertino, California.

As further shown in FIG. 1, the processing device 104 may be communicatively coupled by a third communications link 116C to a network 106. The network 106 may include use of a LAN (or other local network) and/or one or more wide area networks, such as the Internet. The network 106 communicatively couples the processing device 104, via a fourth communications link 116D with one or more servers 108. It is to be appreciated that the third and fourth communications links may be combined, and the network not utilized 106, when a direct connection between a processing device 104 and a server 108 are to be used. The communications links 116C/116D may use any known or later arising communications technologies. The server 108 provides content for presentation to a user. The server 108 may be any device or collection thereof configured to provide content to a processing device 104, non-limiting examples include a digital video recorder, a content streaming server, a cable or satellite set top box, or any other device capable of providing content. One non-limiting example of a content streaming server are those content streaming servers used, directly or indirectly, to facilitate the content streaming service of Sling TV L.L.C. of Englewood, Colorado.

Figure 2:
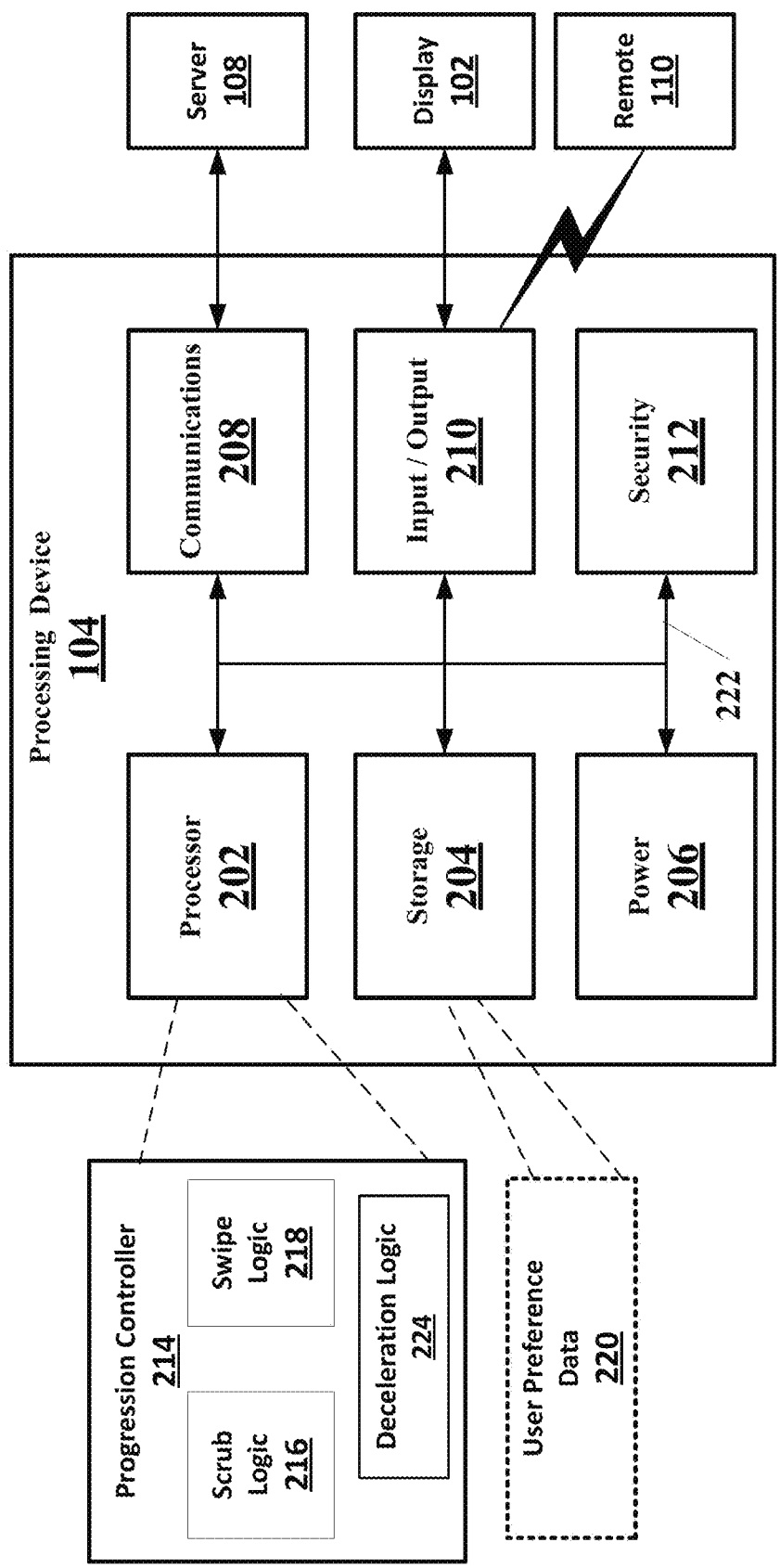
FIG. 2 is a schematic representation of hardware and computer executable functional components of a processing device, as shown in FIG. 1, and in accordance with at least one embodiment of the present disclosure.

As shown in FIG. 2 and for at least one embodiment of the present disclosure, a processing device 104 may include a hardware processor 202 (hereinafter, the "processor"), a storage device 204, a power device 206, a communications device 208, an input/output device 210 and a security device 212. The input/output device 210 may be communicatively coupled to one or more external input/output (I/O) devices, such as display 102 and remote 110 using any known or later arising I/O device technologies. The communications device 208 may be configured for communicatively coupling the processing device 104 with the server 108 using any known or later arising technologies. The security device 212 may provide for any desired level of content and/or device security, using any known or later arising security technologies.

For at least one embodiment, the processor 202 may include one or more physical (as compared to logical) components configured for data processing operations. For at least one embodiment, the processor 202 may include one or more hardware processors, such as 32-bit and 64-bit central processing units, multi-core ARM based processors, microprocessors, microcontrollers, and otherwise. The data processing operations executed by the processor 202 may include one or more non-transient computer executable instructions. The non-transient computer executable instructions may include instructions for executing one or more applications, engines, and/or processes configured to perform computer executable operations (hereafter, "computer instructions"). The hardware and software technologies provided by the processor 202 and the computer instructions may arise in any desired computing configuration including, but not limited to, local, remote, distributed, blade, virtual, or other configurations and/or systems configured for use in support of the one or more embodiments of the present disclosure.

The computer instructions may be stored and/or provided in the storage device 204, provided with the processor 202 itself, such as in cache or read only memory, as firmware, accessible from a remote source, or otherwise. The processor 202 may be communicatively coupled by a bus 222 to each of the elements of the processing device 104 shown in FIG. 2. The bus 222 may use any compatible known or later arising technologies. The processor 202 may be separated into one or more logical processing elements that execute computer instructions to facilitate the various features and functions of the processing device 104, as so configured in accordance with one or more embodiments of the present disclosure.

The storage device 204 may be configured to store one or more user preferences as user preference data 220. Such user preference data 220 may be generated based upon actual use of a given remote 110, by a given user and using supervised or unsupervised learning processes. Such user preference data 220 may be provided by a user during an initial set-up and use of a remote. It is to be appreciated that the user preference data 220, when available, may be used by the processor 202 to determine a given user input as being one of a slow scrub, a fast scrub, a slow swipe, a fast swipe, or otherwise. It is to be appreciated that other user characteristics may also be provided with user preference data and used in determining a type of user input and action(s) to be taken by the processing device 104 or other devices in response to such user input. For example, user preference data may be provided which instruct the remote 110, the processing device 104, or other system components to be responsive to a given user's medical or other condition. Such medical or other condition may inhibit or otherwise affect a given user's ability to provide a given user input. For example, conditions such as arthritis, essential tremors, neuro-muscular ailments, and others may impact how a user inputs an instruction, using a touchpad, hand gesture, or otherwise, to instruct the computer processor 202 to progress through the content. Based on the user preference data, the processor 202 may adjust one or more of the operations described below, with respect to FIG. 4, including, but not limited, to Operation 408 and 410 (as described below).

The processor 202 may be configured to execute computer instructions for instantiating a progression controller engine 214. The progression controller engine 214 may be configured to instruct the processing device 104 to progress through the content in accordance with a then contemporaneously arising user input, as specified by one of a slow scrub, a fast scrub, a slow swipe, and a fast swipe. The processing device 104, in cooperation with the sever 108, may facilitate such progression by requesting and receiving from the server 108 a desired portion of content responsive to the user input. The processing device 104 may be configured to provide one or more indicators on the progress bar that correspond to the requested progression operation and the content available (if any) for presentation in one or more thumbnails, or otherwise, in response to such progression instruction. More specifically, the processor 202 may be configured to execute computer instructions that instruct the input/output device 210 to generate one or more indicators on or relative to the progress bar that correspond to a given user's input action, such as a scrub or swipe action. For at least one embodiment, a representation of a user's input, as sensed by a touchpad or otherwise, may be provided on a 1:1 or any other desired basis relative to a progress bar 120 generated on the display 102. For other embodiments, a user's input may not be represented on the display 102. Accordingly, it is to be appreciated that a user's input action may or may not be represented visually or otherwise to a user via the display 102. For at least one embodiment, a user feedback signal may or may not be generated by the display 102 and in response to a given progression instruction received from a user.

As further shown in FIG. 2, the progression controller engine 214 may be further configured to include a scrub logic 216, a swipe logic 218, and a deceleration logic 224. The scrub logic 216 may be used to determine what user outputs are to be provided when a scrub operation is requested by a user. The swipe logic 218 may be used to determine what user output are to be provided when a swipe operation is requested by a user. The deceleration logic 224 may be used to decelerate a progression such that a user can regain contextual perception of information provided in a given content, while the progression approaches the determined location D.

Figure 4:
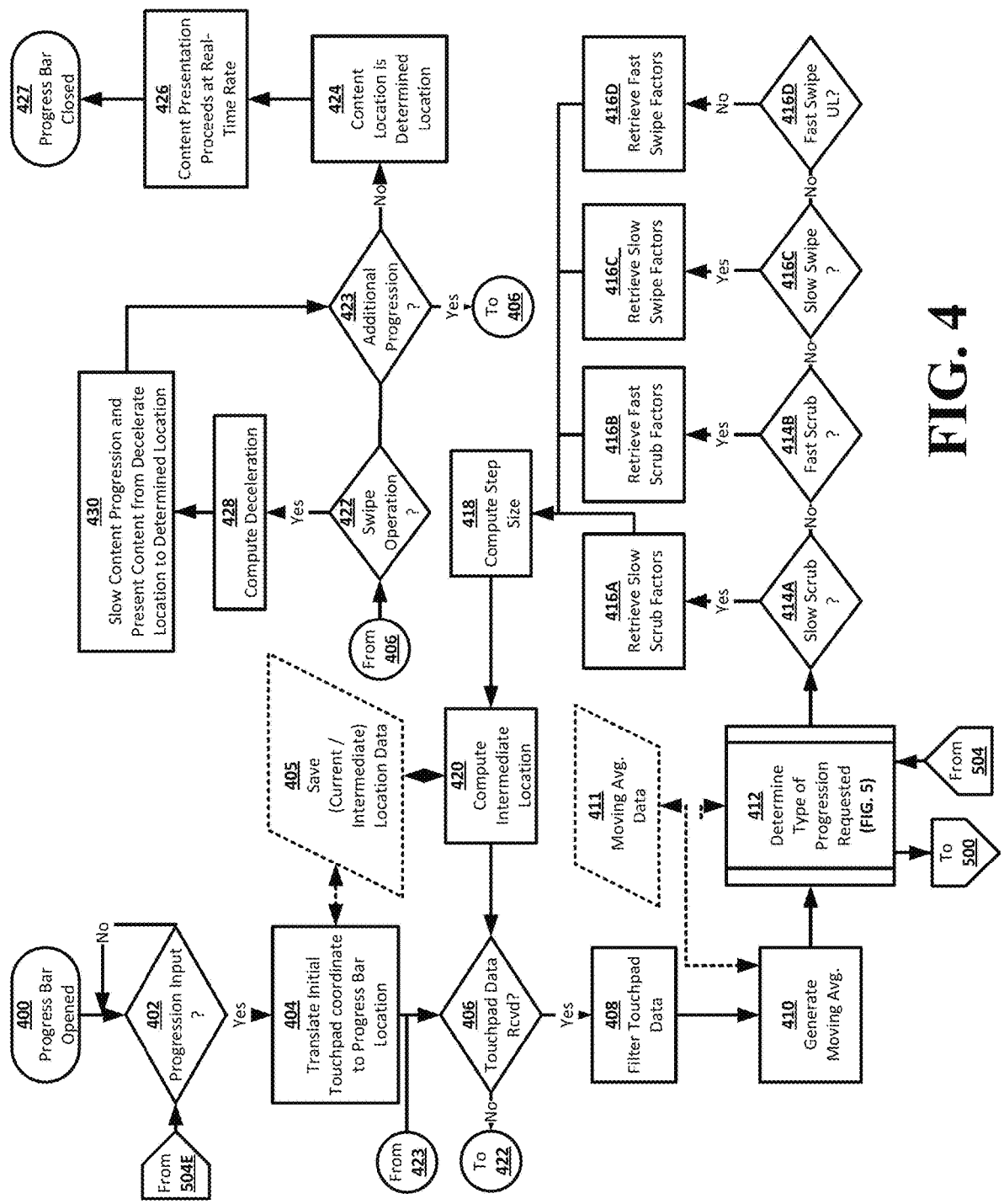
FIG. 4 is a flow chart depicting a process for facilitating user adaptive progression through content and in accordance with at least one embodiment of the present disclosure.

As shown in FIG. 4 and for at least one embodiment of the present disclosure, a process for execution by the progression controller engine 214, as instantiated by the processor 202, begins with a user opening, or otherwise selecting, a progress bar 120 for presentation on the display 102. For at least one embodiment, the process of FIG. 4 may begin when a user instructs the processing device 104 that a progression through a given content is to be performed (Operation 400).

As per Operation 402, the process awaits receipt of a progression input from a user as provided by the user via the remote 110. It is to be appreciated that for at least one embodiment a user instruction for a desired form of progression through a given content may be provided by the user performing a scrub or swipe action relative to the touchpad 112 of the remote 110. For other embodiments, the remote 110 and processing device 104 may be configured to support the receiving of other forms of user progression instructions, such as those provided by hand-gesture movements, or otherwise. Any desired form of user input instruction reception may be supported by the remote 110 and processing device 104. The remote 110 and processing device 104 may perform such other forms of user inputs by executing appropriate computer instructions.

Per Operation 404, when a user progression instruction is initiated, the remote 110 captures the initial touchpad coordinates (as depicted in FIGS. 3A-3D as the initial sector 302A/302B/302C and 302D on the touchpad array) and communicates such coordinates to the processor 202. The processor 202 translates the initial touchpad coordinates into a progress bar location (when available) or otherwise to a current location C in the content, as presented in content area 118 then being provided by the processing device 104 for presentation on the display 102. These initial touchpad coordinates may be saved as current location data in the storage device 204 (as per Operation 405).

Per Operation 406, the process continues with awaiting additional touchpad data. The additional touchpad data corresponds to a user's progression instruction, as sensed by the touchpad 112, and communicated as one or more of raw touchpad, processed touchpad data and/or a computer executable instruction to the processor 202. Referring again to FIGS. 3A-3D and FIG. 6, a user's progression instruction may be provided by a movement of a user's finger relative to a sensor (e.g., a touchpad 112) over a distance (e.g., as measured in terms of an array of sectors) and within a velocity range (e.g., velocity threshold ranges K-N) until an end sector 304A-D on the array of sectors is reached. In FIGS. 3A-3D, the distance traveled is represent by the length of vector's V1-V4 and the velocity is represented by the slope of vectors V1-V4, where a higher slope indicates a higher velocity. It is to be appreciated that for at least one embodiment, one or more of a swipe action or a scrub action may involve a non-removal of a user's finger from the touchpad surface with the last sensed location corresponding to the end sector 304A-D.

For at least one embodiment, during a scrub action the user's finger may dwell on the end sector 304A-D for less than 0.1 to 0.05 seconds. For at least one embodiment, during a swipe action, a user's finger may dwell on the end sector 304A-D for less than 0.5 seconds. Accordingly, for at least one embodiment, the processor 202 may be configured to distinguish between scrub instructions and swipe instructions based upon a dwell time associated with the end sector 304A-D sensed by the remote 110. For at least one embodiment, an end sector 304C and 304D for a swipe movement may not correspond to an actual location at which a user's movement of their finger actually comes to rest. This may arise from the user's removal of their finger from the touchpad surface during the swiping motion. Accordingly, an actual end or resting position of a user's finger may arise outside of the boundaries of the touchpad 112. Given the same, erroneous and/or transient touchpad signals may be introduced by the user's actual use of the touchpad.

Likewise, it is to be appreciated that a given sensor, such as a capacitive touchpad on a remote or other device, may provide for imprecise initial sector and/or end sector data readings. Such imprecision may arise for any reason and herein is individually and collectively treated as input noise.

Per Operation 408, the processor 202 filters the received touchpad data for input noise, other signal artifacts and/or erroneous signals provided by the remote 110. For at least one embodiment of the present disclosure, Operation 408 may include the process of identifying relative relationships between an initial sector and an end sector without consideration as to the precise locations thereof on the touchpad. In accordance with at least one embodiment, a sensed user's actual initial sector and a sense actual end sector are not relevant. Instead, a relative distance between such sectors and a relative velocity traveled therebetween is relevant. Accordingly, Operation 408 may include the transformation of the received touchpad data into an initial vector, that is ultimately treated as one of a slow scrub vector W1, a fast scrub vector W2, a slow swipe vector W3, or a fast swipe vector W4—such vectors being illustratively shown in FIGS. 3A-3D and further delineated by the velocity thresholds VT1, VT2, VT3 and VT4 shown in FIG. 6. For at least one embodiment, Operation 408 may include application of a finite impulse response filtering operation to the received touchpad data.

Per Operation 410, the process may include sampling or otherwise processing the received touchpad data to remove noise, smooth the received data, or otherwise. For at least one embodiment, the sampling may include generating a moving average. The moving average may be generated by the remote 110 and/or the processing device 104. For at least one embodiment, a five sector array moving average is generated. For at least one embodiment, a generating of a moving average may be replaced and/or augmented by use of any statistical, mathematical, or other signal processing operation which facilitate generating a set of user input data, as received from a touchpad or other input device, that is representative of a given user's requested progression type. Any form of data sampling and/or filtering may be used to remove noise, smooth, or other process received touchpad data. Such operations are commonly referred to herein, and not by way of limitation, as generating a moving average. For at least one embodiment, the moving average data provides an estimate velocity and/or distance change for each point received by the touchpad 112. The moving average data may be stored, as per Operation 411.

Per Operation 412, the process may include determining a user requested progression type T requested based on the touchpad data generated by the user's input actions. Operation 412 may be performed by the remote 110 and/or the processing device 104. These operations are further illustrated with respect to FIG. 5.

Figure 5:
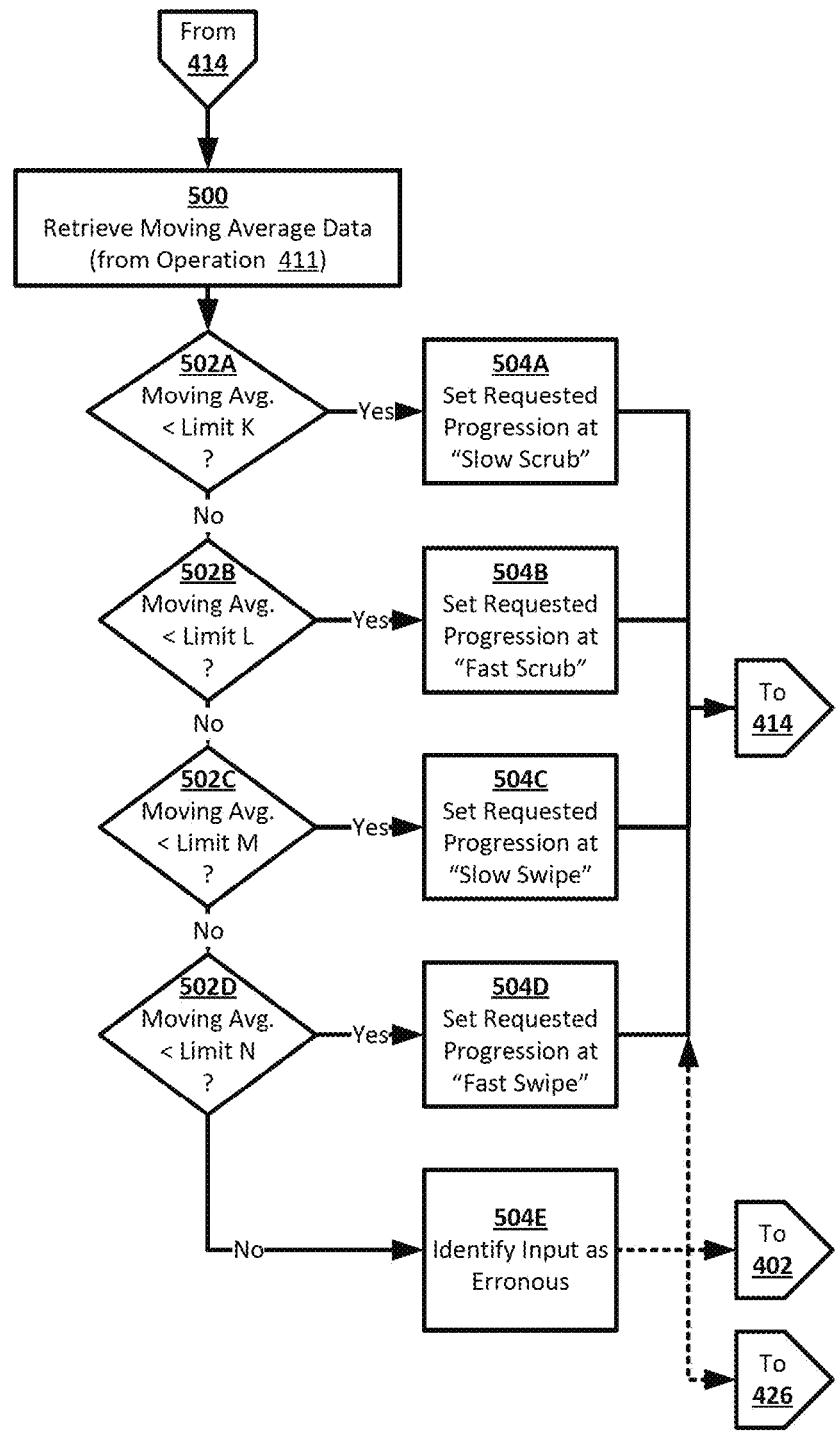
FIG. 5 is a flow chart depicting a process for determining a type of user input and in accordance with at least one embodiment of the present disclosure.

As shown in FIG. 5, per Operation 500, a process for determining a user requested progression type T, as based on received touchpad data, may include retrieving any previously stored moving average data (as stored per Operation 411). It is to be appreciated that for initial progression, moving average data may not be previously stored or available. For at least one embodiment, while a user's finger moves across the touchpad, multiple sets of activated array sector data is generated by the touchpad 112 and remote 110. It is to be appreciated that the processing speed of the touchpad and remote electronics, and sensitivity thereof, are much faster than the user's movement. Thus, each user action may generate numerous sets of touchpad data. These numerous data sets may be used in computing a moving average representative of the velocity and array sectors traveled across the touchpad, which as per FIGS. 3A-D and FIG. 6 are representative of the then user requested progression type T.

Per Operations 502A-502D, a determination is made, based on the moving average data, as to the type of progression requested.

Per Operations 502A and 504A, if the computed moving average is less than the first velocity threshold VT1, the processor 202 determines and sets the user requested progression is a "slow scrub."

Per Operations 502B and 504B, if the computed moving average is equal to or less than the second velocity threshold VT2, the processor 202 determines and sets the user requested progression as being a "fast scrub."

Per Operations 502C and 504C, if the computed moving average is equal to or less than the third velocity threshold VT3, the processor 202 determines and sets the user requested progression as being a "slow swipe."

Per Operations 502D and 504D, if the computed moving average is equal to or less than the fourth velocity threshold VT4, the processor 202 determines and sets the user requested progression as being a "fast swipe."

Depending on the determined progression type T, operations continue with Operations 414A-414D. Further, the moving average data calculated may be optionally stored for later determinations. It is to be appreciated that the iterative process shown by Operations 406 through 420 will commonly be performed multiple times during any given user input action and before a user ceases to provide input on a touchpad (e.g., by removal of their finger from the touchpad surface).

Last, if the computed moving average is greater than the fourth velocity threshold VT4, the processor 202 may be configured to identify the sensed user progression instruction, as provided by the remote 110, as being an erroneous input. Content progression operations may accordingly proceed based on the previously calculated moving average at Operation 414, cease as per Operation 426, or resume with awaiting new user input at Operation 402.

As further shown in FIG. 4, after the type of progression requested is determined and set, per Operations 414A-414D, 416A-D, 418 and 420 corresponding to the requested progression is retrieved from storage 204 and used to iteratively compute two or more intermediate locations I. For at least one embodiment, each iterative intermediate location I may be determined based on the current location C, which may correspond to the last previous calculated intermediate location, plus the step size Z, as specified by Equation 1.

More specifically and per Operation 414A, 416A, 418 and 420, when a slow scrub progression is set, a corresponding slow scrub shift factor $S_1$ and a slow scrub velocity factor $V_1$ are used in Equation 2. One or more of these shift velocity factors may be predetermined, based upon experimental results or otherwise. These factors may be retrievable from storage, the remote, the server or determined real time.

Per Operation 414B, 416B, 418 and 420, when a fast scrub progression is set, a corresponding fast scrub shift factor $S_2$ and a fast scrub velocity factor $V_2$ are used in Equation 2. One or more of these shift velocity factors may be predetermined, based upon experimental results or otherwise. These factors may be retrievable from storage, the remote, the server or determined real time.

Per Operation 414C, 416C, 418 and 420, when a slow swipe progression is set, a corresponding slow swipe shift factor $S_3$ and a slow swipe velocity factor $V_3$ are used in Equation 2. One or more of these shift velocity factors may be predetermined, based upon experimental results or otherwise. These factors may be retrievable from storage, the remote, the server or determined real time.

Per Operation 414D, 416D, 418 and 420, when a fast swipe progression is set, a corresponding fast swipe shift factor $S_4$ and a fast swipe velocity factor $V_4$ are used in Equation 2. One or more of these shift velocity factors may be predetermined, based upon experimental results or otherwise. These factors may be retrievable from storage, the remote, the server or determined real time.

As shown, the process iteratively loops through Operations 406 to 420 until no additional touchpad data (or other form of user progression input instruction) is received. For at least one embodiment and during Operations 406 to 420, the content continues to be presented on display 102 in content area 118. For another embodiment and during Operations 406 to 420, the content being presented in content area 118 may be paused, stopped, periodically updated, progressed at a rate specified by then arising progression type T, or otherwise presented. The iterative determinations may be suitably stored, as per Operation 405. The process continues with Operation 422.

Per Operation 422, a determination is made as to whether the requested user progression type T is for a slow swipe or a fast swipe. If "No", the process continues with Operation 423. For another embodiment, where deceleration is used in conjunction with a fast scrub, Operation 422 may be expanded to also include determining whether a fast scrub operation is being performed.

Per Operation 423, a determination is made as to whether an additional progression is desired. For at least one embodiment, Operation 423 may involve one or more sub-operations, which are not shown in FIG. 4 for purposes of clarity. Such one or more sub-operations may include, but are not limited to, determining whether a user's finger is still on the touchpad, whether a user "resume" or similar operation has been requested, whether a pre-determined time period has elapsed within which an additional user progression input has not been received, or whether other user input actions or inputs have been received that are indicative of a user's desire to either progress through the content on a real-time or an other than real-time basis. For at least one embodiment, a user may request a resumption to a real-time presentation rate for the content by tapping the touchpad. For at least one embodiment, and during at least Operation 423, the content may continue to be presented in the content area 118, and a progress bar 120 may also continue to be presented. If an additional progression is desired, the process continues at Operation 406. If no additional progressions are desired, the process continues at Operation 424.

Per Operation 424, if a slow scrub or fast scrub progression was requested by the user, the last determined intermediate location I is set equal to the determined location D. If a slow swipe or a fast swipe progression was requested by the user, as per Operation 430, the content location has been decelerated to the determined location D, thus Operation 424 may not be executed for at least one embodiment. However, should the deceleration be interrupted or terminated prior to completion thereof, Operation 424 may be performed to advance the content location to the determined location.

Per Operation 426, presentation of the content proceeds at the determined location D at the real-time rate.

Per Operation 427, the progress bar is closed or other actions are taken by the processor 202 that terminate or suspends use of the progression controller 214.

Referring again to Operation 422, if a slow swipe or a fast swipe operation was requested, the process proceeds from Operation 422 to Operation 428.

Per Operation 428, one or more deceleration rates are determined. As discussed above, one or more deceleration factors may be used to decelerate a progression through content to a slower rate. The deceleration factors may vary based upon user preferences, type of content, duration of content, and other factors. One or more deceleration factors Q1-Q5 may be used to slow a progression of content from an intermediate location 700 (FIG. 7) through one or more second locations 702, to the determined location 704. For at least one embodiment, the deceleration factors used may be determined based on an arc tangent curve, such as one modeled for the curve shown in FIG. 7. For at least one embodiment, the arc tangent curve may be determined based on a detected user final movement velocity, as represented by the last stored moving average data, as determined per Operation 410 and as stored per Operation 411.

Per Operation 430, the content progression and corresponding content presented on display 102 therewith decelerates until the determined location D is reached. The process then continues with Operations 423, 424, 426 and 427, as described above.

For at least one embodiment, a user may interrupt and/or terminate the Operations shown in FIG. 4 by providing a user "stop" input action, such as a tap of the touchpad. For at least one embodiment, when a stop input action is received, the system immediately proceeds to Operation 424 and continues.

It is to be appreciated that the operations described above and depicted in FIG. 4 and FIG. 5 are illustrative only and are not intended herein to occur, for all embodiments of the present disclosure, in the order shown, in sequence, or otherwise. One or more operations may be performed in parallel and operations may be not performed, as provided for any given use of an embodiment of the present disclosure.

For at least one embodiment of the present disclosure, a user's movement of their finger on a touchpad, or other user input, may be mapped to a corresponding indication on the display 102. That is, for at least one embodiment, a user's inputs may correspond to and be represented to such user as a system output (as presented, e.g., on the display 102). For at least one embodiment, a user's slow, deliberate movement of their finger on the touch pad may correspond to a slow, fine movement of an indicator, a thumbnail, the content itself, a combination of the foregoing or otherwise. Similarly, a user's faster movements may be correspondingly represented by the system as one or more output signals (as presented, e.g., on the display 102). Other forms of user output signals may be provided, as desired for one or more embodiments, such as vibrations of the remote, audible signals, or otherwise.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A process, for facilitating user adaptive progressions through two or more non-displayed segments of a given content, comprising:
    logically segmenting a touchpad of a user input device into an array having multiple array sectors including a first array sector and a second array sector;
        wherein each of the array sectors is uniquely defined by a given combination of a first index value M and a second index value N;
    defining two or more contiguous array sectors as a given array sector range;
    defining a first combination of a first rate of progression of a user input motion relative to the given array sector range as a first progression type;

defining a second combination of a second rate of progression of the user input motion relative to the given array sector range as a second progression type;

receiving, on the touchpad, a detected first user input motion;
wherein the detected first user input motion corresponds to a desired rate of progression through the two or more non-displayed segments of the given content;
wherein the desired rate of progression corresponds to one of the first progression type and the second progression type; and
wherein the detected first user input motion corresponds to the given array sector range; and determining, based on the detected first user input motion, whether the first progression type or the second progression type corresponds to the desired rate of progression through the two or more non-displayed segments of the given content.

2. The process of claim 1,
wherein the first progression type is a power function of a scaled content duration.

3. The process of claim 1,
wherein the first progression type is a power function of a scaled content duration remaining gL between a current location C in the given content and an end location E for the given content;
wherein g is a duration scaling factor determined based on experimental results; and
wherein L is a content duration remaining between the current location C and the end location E.

4. The process of claim 3,
wherein the first progression type is a function of a scaling constant and the scaled content duration remaining gL raised to a power constant P.

5. The process of claim 4, further comprising:
executing a slow scrub progression through the two or more non-displayed segments of the given content when the detected first user input motion occurs within a first area defined by:
a first velocity threshold VT1 upper limit; and
a first array sector range AS1.

6. The process of claim 1, further comprising:
decelerating a progression through the two or more non-displayed segments of the given content from a first intermediate location to a determined location D; and
wherein the decelerating occurs based on two or more deceleration factors Q.

7. The process of claim 6,
wherein the two or more deceleration factors Q are determined based on an arc tangent curve.

8. The process of claim 1, further comprising:
executing a slow scrub progression through the two or more non-displayed segments of the given content when the detected first user input motion occurs within a first area defined by:
a first velocity threshold upper limit; and
a first array sector range.

9. The process of claim 1, further comprising:
executing a fast scrub progression through the two or more non-displayed segments of the given content when the detected first user input motion occurs within a second area defined by:
a second velocity threshold upper limit; and
a second array sector range.

10. The process of claim 1, further comprising:
executing a slow swipe scrub progression through the two or more non-displayed segments of the given content when the detected first user input motion occurs within a third area defined by:
a third velocity threshold upper limit; and
a third array sector range.

11. The process of claim 1, further comprising:
executing a fast swipe progression through the two or more non-displayed segments of the given content when the detected first user input motion occurs within a fourth area defined by:
a fourth velocity threshold upper limit; and
a fourth array sector range.

12. The process of claim 1,
wherein the first progression type is a function of an adjustment content R subtracted from a product of a scaled content duration remaining gL and a scaling constant F.

13. The process of claim 1, further comprising:
progressing through the two or more non-displayed segments of the given content to an intermediate location I; and
wherein the intermediate location I is a function of a current location C and a step size Z.

14. The process of claim 13,
wherein the step size Z is a function of a shift factor S plus a velocity factor V exponentially raised to a power based on a scaled content duration remaining gL.

15. The process of claim 14,
wherein a first shift factor S1 and a first velocity factor V1 are used for a slow scrub progression through the two or more non-displayed segments of the given content;
wherein a second shift factor S2 and a second velocity factor V2 are used for a fast scrub progression through the two or more non-displayed segments of the given content;
wherein a third shift factor S3 and a third velocity factor V3 are used for a slow swipe progression through the two or more non-displayed segments of the given content; and
wherein a fourth shift factor S4 and a fourth velocity factor V4 are used for a fast swipe progression through the two or more non-displayed segments of the given content.

16. The process of claim 15,
wherein at least one of the first shift factor, the second shift factor, the third shift factor and the fourth shift factor has a unique value; and
wherein at least one of the first velocity factor, the second velocity factor, the third velocity factor and the fourth velocity factor has a unique value.

17. A non-transient computer readable medium storing computer instructions which, when executed by a processor, cause an electronic device to perform operations, the operations comprising:
logically segmenting a touchpad of the electronic device into an array having multiple array sectors including a first array sector and a second array sector;
wherein each of the array sectors is uniquely defined by a given combination of a first index value M and a second index value N;
defining two or more contiguous array sectors as a given array sector range;
defining a first combination of a first rate of progression of a user input motion relative to the given array sector range as a first progression type;

defining a second combination of a second rate of progression of the user input motion relative to the given array sector range as a second progression type;
receiving, on the touchpad, a detected first user input motion;
wherein the detected first user input motion corresponds to a desired rate of progression through two or more non-displayed segments of a given content; and
wherein the detected first user input motion corresponds to the given array sector range and a progression of the user input motion along the given array sector range of the touchpad of the electronic device;
determining, based on the detected first user input motion, whether the first progression type or the second progression type, which corresponds to the desired rate of progression through the two or more non-displayed segments of the given content;
executing a slow scrub progression through the two or more non-displayed segments of the given content when the detected first user input motion occurs within a first area of the multiple array sectors defined by:
a first velocity threshold VT1 upper limit; and
a first array sector range AS1;
executing a fast scrub progression through the two or more non-displayed segments of the given content when the detected first user input motion occurs within a second area of the multiple array sectors defined by:
a second velocity threshold upper limit; and
a second array sector range;
executing a slow swipe scrub progression through the two or more non-displayed segments of the given content when the detected first user input motion occurs within a third area of the multiple array sectors defined by:
a third velocity threshold upper limit; and
a third array sector range;
executing a fast swipe progression through the two or more non-displayed segments of the given content when the detected first user input motion occurs within a fourth area of the multiple array sectors defined by:
a fourth velocity threshold upper limit; and
a fourth array sector range.

18. The non-transient computer readable medium of claim 17,
wherein the operations further comprise:
progressing through the two or more non-displayed segments of the given content to an intermediate location I; and
wherein the intermediate location I is a function of a current location C and a step size Z.

19. A non-transient computer readable medium storing computer instructions which, when executed by a processor, cause an electronic device to perform operations comprising:
logically segmenting a touchpad of the electronic device into an array having multiple array sectors including a first array sector and a second array sector;
wherein each of the array sectors is uniquely defined by a given combination of a first index value M and a second index value N;
defining two or more contiguous array sectors as a given array sector range;
defining a first combination of a first rate of progression of a user input motion relative to the given array sector range as a first progression type;
defining a second combination of a second rate of progression of the user input motion relative to the given array sector range as a second progression type;
receiving a detected first user input motion;
wherein the detected first user input motion corresponds to a desired rate of progression through two or more non-displayed segments of a given content; and
wherein the detected first user input motion corresponds to the given array sector range and a progression of the user input motion along the given array sector range of a touchpad of the electronic device;
determining, based on the detected first user input motion, the first progression type which corresponds to the desired rate of progression through the two or more non-displayed segments of the given content;
executing, when the first progression type corresponds to a slow scrub user action, a slow scrub progression through the two or more non-displayed segments of the given content;
wherein a first shift factor Si and a first velocity factor V1 are used for the slow scrub progression through the two or more non-displayed segments of the given content;
executing, when the first progression type corresponds to a fast scrub user action, a fast scrub progression through the two or more non-displayed segments of the given content;
wherein a second shift factor S2 and a second velocity factor V2 are used for the fast scrub progression through the two or more non-displayed segments of the given content;
executing, when the first progression type corresponds to a slow swipe user action, a slow swipe progression through the two or more non-displayed segments of the given content;
wherein a third shift factor S3 and a third velocity factor V3 are used for the slow swipe progression through the two or more non-displayed segments of the given content; and
executing, when the first progression type corresponds to a fast swipe user action, a fast swipe progression through the two or more non-displayed segments of the given content; and
wherein a fourth shift factor S4 and a fourth velocity factor V4 are used for the fast swipe progression through the two or more non-displayed segments of the given content.

* * * * *